(12) United States Patent
Charette

(10) Patent No.: US 11,876,734 B2
(45) Date of Patent: *Jan. 16, 2024

(54) INTEGRATED ROUTER HAVING A POWER CYCLING SWITCH

(71) Applicant: VENTUS IP HOLDINGS, LLC, Dover, DE (US)

(72) Inventor: Keith Charette, Fairfield, CT (US)

(73) Assignee: Ventus IP Holdings, LLC, Dover, DE (US)

(*) Notice: Subject to any disclaimer, the term of this patent is extended or adjusted under 35 U.S.C. 154(b) by 25 days.

This patent is subject to a terminal disclaimer.

(21) Appl. No.: 17/515,823

(22) Filed: Nov. 1, 2021

(65) Prior Publication Data

US 2022/0052966 A1 Feb. 17, 2022

Related U.S. Application Data

(63) Continuation of application No. 15/921,839, filed on Mar. 15, 2018, now Pat. No. 11,218,425.

(Continued)

(51) Int. Cl.
  *G06F 1/00* (2006.01)
  *G06F 11/30* (2006.01)
  (Continued)

(52) U.S. Cl.
  CPC ............ *H04L 49/405* (2013.01); *H04L 12/10* (2013.01); *H04L 45/24* (2013.01); *H04L 45/60* (2013.01); *H04L 69/14* (2013.01)

(58) Field of Classification Search
  CPC ..................................................... H04L 49/405
  See application file for complete search history.

(56) References Cited

U.S. PATENT DOCUMENTS

6,091,956 A * 7/2000 Hollenberg ............ G06Q 30/02
                                                     455/566
8,204,990 B1    6/2012 Avery et al.
                    (Continued)

FOREIGN PATENT DOCUMENTS

CN      1491007      4/2004
CN      1747280      3/2006
                    (Continued)

OTHER PUBLICATIONS

European Patent Office Action dated Jun. 2, 2022 from corresponding European Application No. 18768744.7 2022.

(Continued)

*Primary Examiner* — Mohammed H Rehman
(74) *Attorney, Agent, or Firm* — Grogan, Tuccillo & Vanderleeden, LLP

(57) ABSTRACT

An integrated router is provided. The integrated router includes at least one network interface, a power supply input, a power supply output, and a power cycling switch. The at least one network interface is operative to place a first network device in electronical communication with a second network device. The power supply input is operative to receive electrical power from a power supply. The power supply output is operative to provide the electrical power to the second network device. The power cycling switch electrically connects the power supply input to the power supply output and is operative to be toggled by a remote network device via the at least one network interface so as to power cycle the second network device.

18 Claims, 5 Drawing Sheets

Related U.S. Application Data

(60) Provisional application No. 62/471,573, filed on Mar. 15, 2017.

(51) Int. Cl.
*H04L 49/40* (2022.01)
*H04L 45/24* (2022.01)
*H04L 12/10* (2006.01)
*H04L 45/60* (2022.01)
*H04L 69/14* (2022.01)

(56) References Cited

U.S. PATENT DOCUMENTS

| | | | |
|---|---|---|---|
| 9,531,550 B2 | 12/2016 | Jabbaz et al. | |
| 11,218,425 B2* | 1/2022 | Charette | H04L 69/14 |
| 2004/0162898 A1 | 8/2004 | Rich | |
| 2010/0102631 A1* | 4/2010 | Chiou | H01R 13/7038 307/39 |
| 2010/0145542 A1* | 6/2010 | Chapel | H02J 3/14 700/295 |
| 2014/0119084 A1* | 5/2014 | Ashikaga | H02M 1/32 363/126 |

FOREIGN PATENT DOCUMENTS

| | | |
|---|---|---|
| CN | 102099783 | 6/2011 |
| CN | 102132523 | 7/2011 |
| CN | 202548566 | 11/2012 |
| CN | 105247740 | 1/2016 |
| CN | 105453511 | 3/2016 |
| CN | 1065030545 | 10/2016 |

OTHER PUBLICATIONS

Canadian Office Action dated Oct. 13, 2022 from corresponding Canadian Application No. 3,056,402.
English translation of Chinese Office Action dated Feb. 24, 2023 from corresponding Chinese Application No. 201880018667.0.

* cited by examiner

INTEGRATED ROUTER HAVING A POWER CYCLING SWITCH

CROSS-REFERENCE TO RELATED APPLICATIONS

This application is a continuation application of, and claims priority to and the benefit of, U.S. patent application Ser. No. 15/921,839, filed on Mar. 15, 2018, which claims priority to U.S. Provisional Application Ser. No. 62/471,573, filed on Mar. 15, 2017, the disclosures of which are incorporated by reference herein in their entireties.

BACKGROUND

Technical Field

Embodiments of the invention relate generally to computer networking devices, and more specifically, to an integrated router having a power cycling switch.

Discussion of Art

A wireless router is a device that performs the functions of a router and also includes the functions of a wireless access point. It is used to provide access to the Internet or to a private computer network. It can function in a wired local area network ("LAN"), in a wireless-only LAN ("WLAN"), or in a mixed wired/wireless network. In particular, wireless routers offer a convenient way to connect a small number of wired and any number of wireless network devices to each other, to the Internet, as well as provide for file sharing and printing.

Presently, wireless routers are being used to connect remotely located network devices, e.g., automatic teller machines ("ATMs"), back to a central server/network. Many network devices, however, typically need to be power cycled, i.e., a "hard reset," in order to clear/correct a system error/lockup and/or for a hardware/firmware/software upgrade to take effect. As used herein with respect to electrical devices, the terms "power cycle" and "hard reset" refer to the process of temporarily restricting electrical power to such devices.

As sending maintenance personal to the physical location of a network device for the purpose of power cycling the device is expensive and time consuming, remote power switches have been developed which provide for an operator, e.g., maintenance personnel or computer, to remotely power cycle a network device.

While stand-alone wireless routers and stand-alone remote power switches are known in the art, no present device integrates the functions of both technologies into a single form factor. Accordingly, present solutions for supporting a remotely located network device involve deploying two separate stand-alone devices at the site of the network device, i.e., both a wireless router and a remote power switch. Manufacturers of computer networking devices have not sought to incorporate the features of a remote power switch into a wireless router as it is commonly believed that having the functions of each divided over two separate physical devices provides for flexibility in designing remote network topographies.

What is needed, therefore, is a router having an integrated power cycling switch.

BRIEF DESCRIPTION

In an embodiment, an integrated router is provided. The integrated router includes at least one network interface, a power supply input, a power supply output, and a power cycling switch. The at least one network interface is operative to place a first network device in electronical communication with a second network device. The power supply input is operative to receive electrical power from a power supply. The power supply output is operative to provide the electrical power to the second network device. The power cycling switch electrically connects the power supply input to the power supply output and is operative to be toggled by a remote network device via the at least one network interface so as to power cycle the second network device.

In another embodiment, a system is provided. The system includes an integrated router, a first network device, a second network device, and a remote network device. The integrated router has at least one network interface, a power supply input operative to receive electrical power from a power supply, a power supply output, and a power cycling switch that electrically connects the power supply input to the power supply output. The first network device and the second network device are operative to electronically communicate with each other via the at least one network interface. The remote network device is operative to toggle the power cycling switch via the at least one network interface. The power supply output is operative to provide the electrical power to the second network device such that toggling the power cycling switch power cycles the second network device.

In yet another embodiment, a method is provided. The method includes: placing a first network device in electronical communication with a second network device by way of at least one network interface of an integrated router; receiving electrical power at a power supply input of the integrated router from a power supply; providing the electrical power to the second network device via a power supply output of the integrated router electrically connected to the power supply input via a power cycling switch of the integrated router; and power cycling the second network device by toggling the power cycling switch via a remote network device by way of the at least one network interface.

DRAWINGS

The present invention will be better understood from reading the following description of non-limiting embodiments, with reference to the attached drawings, wherein below:

DETAILED DESCRIPTION

Figure 1:
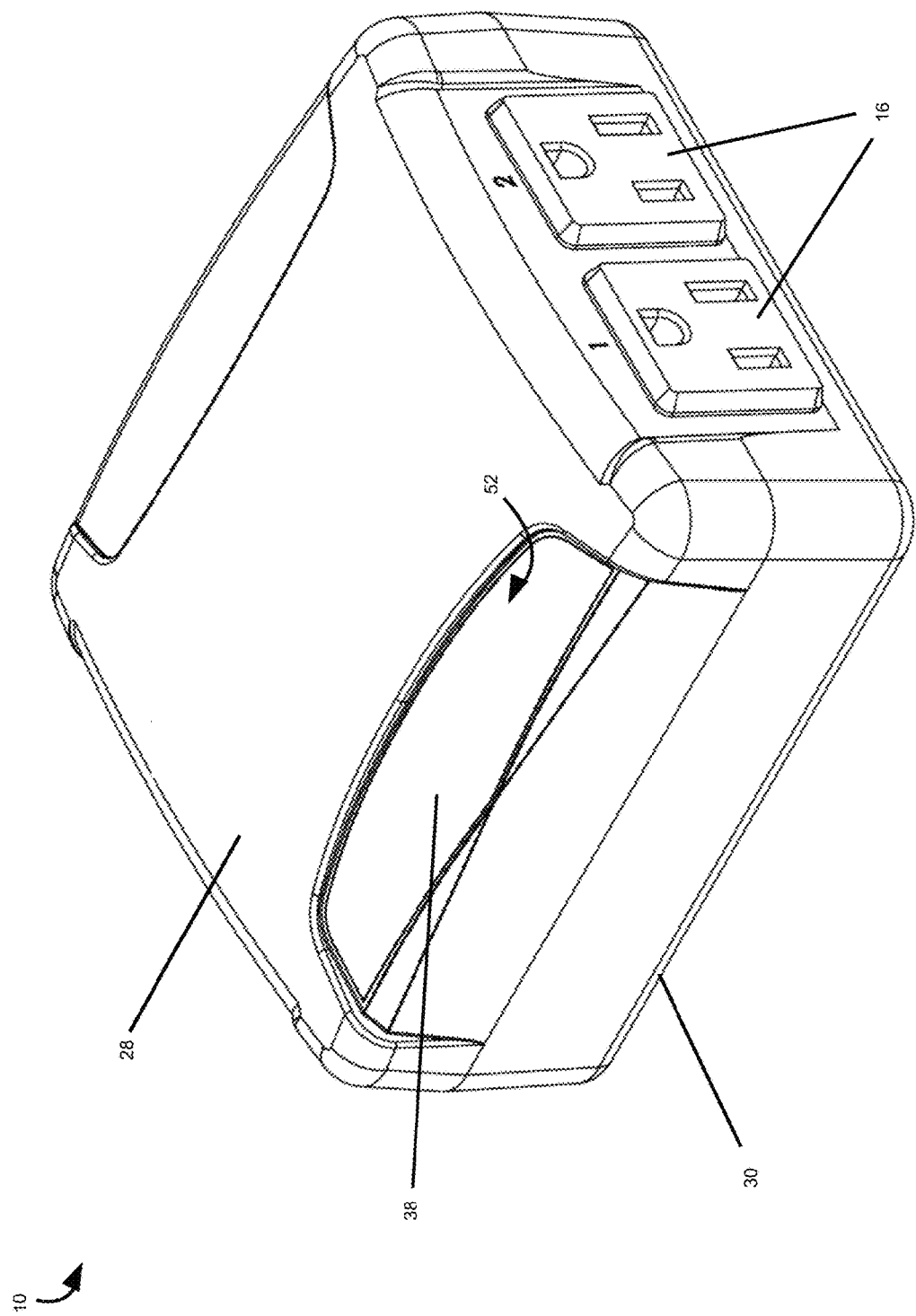
FIG. 1 is a perspective view of an integrated router, in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "network interface," as used herein with respect to network devices, refers to a physical network connection interface, e.g., an Ethernet card having a radio and/or a wired connection port such as a RJ-45 or coaxial connection, that supports a computer network connection, e.g., a TCP/IP connection. The term "real-time," as used herein, means a level of processing responsiveness that a user senses as sufficiently immediate or that enables the processor to keep up with an external process.

Further, while embodiments of the invention are described herein with respect to TCP/IP stack compliant networking devices, it will be understood that the embodiments and principals disclosed herein are equally applicable to other network paradigms, e.g., IPX/SPX, which provide for the switching and/or routing of packets/datagrams.

Figure 2:
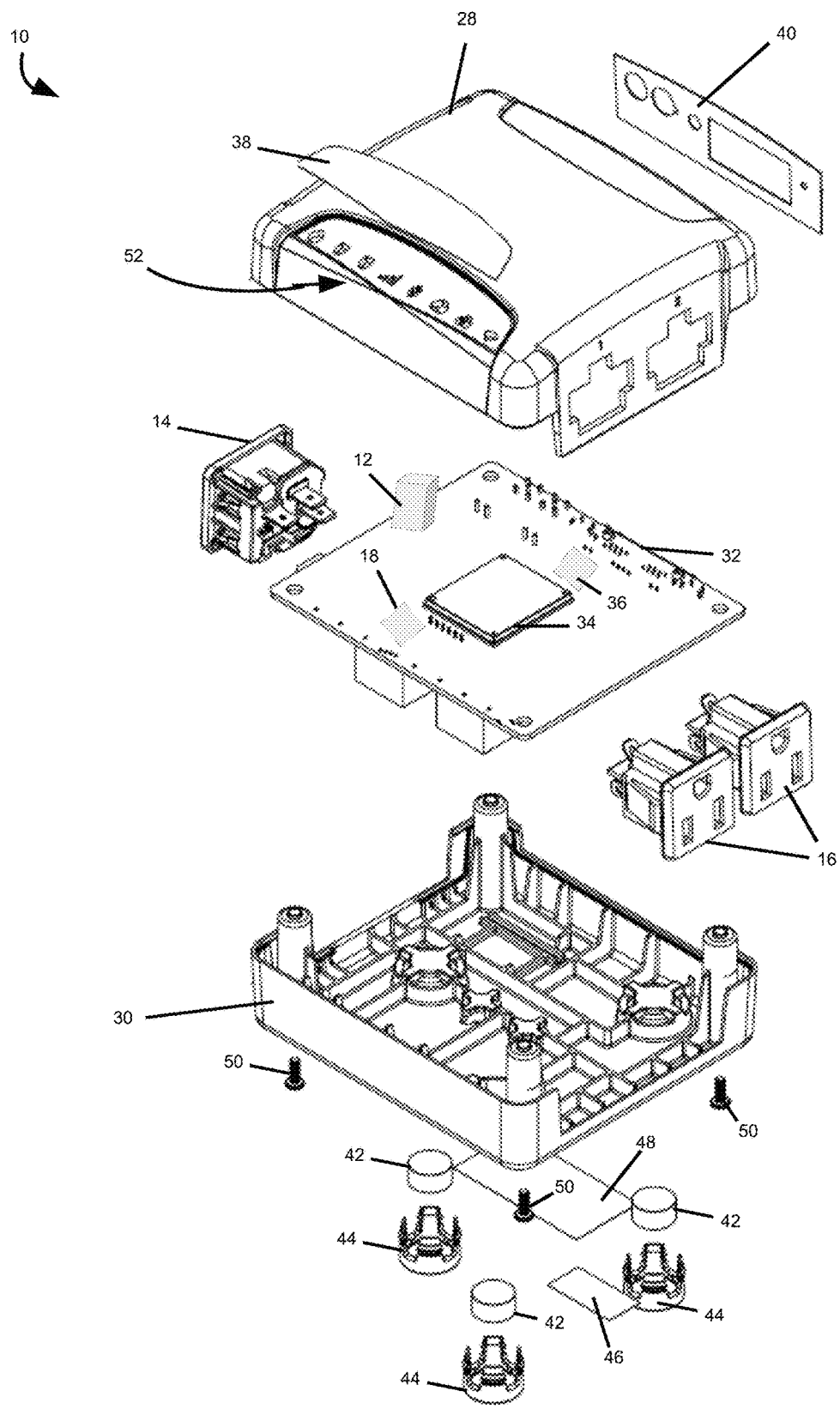
FIG. 2 is an exploded view of the integrated router of FIG. 1, in accordance with an embodiment of the present invention.
Figure 5:
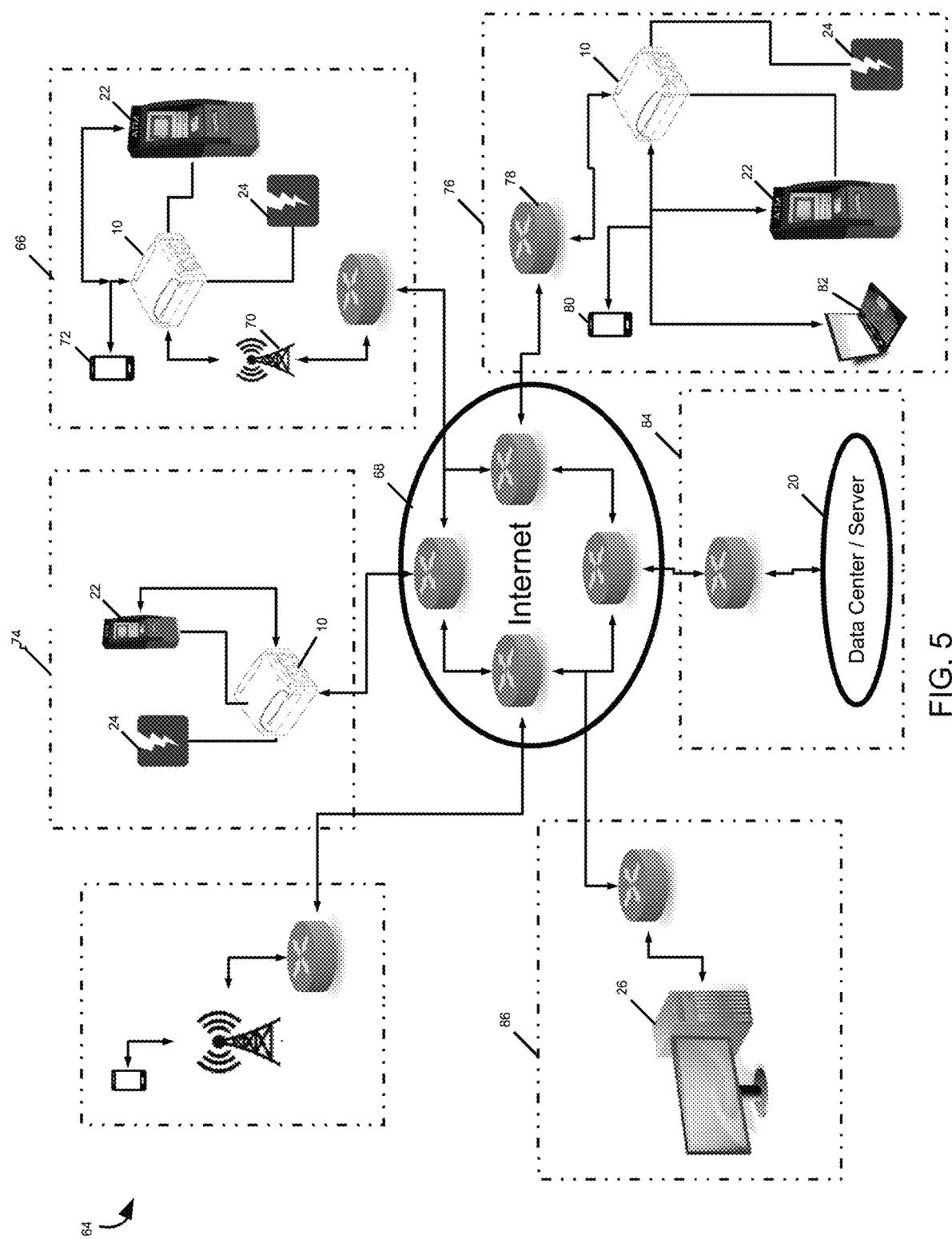
FIG. 5 is a diagram of a system that includes the integrated router of FIG. 1, in accordance with an embodiment of the present invention.

Referring now to FIGS. 1-2, an integrated router 10, also referred to hereinafter simply as a "router," in accordance with an embodiment of the invention is shown. The integrated router 10 includes at least one network interface 12, a power supply input 14, at least one power supply output 16, and a power cycling switch 18. The at least one network interface 12 is operative to place a first network device 20 (FIG. 5) in electronical communication with a second network device 22 (FIG. 5). The power supply input 14 is operative to receive electrical power from a power supply 24 (FIG. 5). The power supply output 16 is operative to provide the electrical power to the second network device 22. The power cycling switch 18 electrically connects the power supply input 14 to the power supply output 16 and is operative to be toggled by a remote network device 26 (FIG. 5) via the at least one network interface 12 so as to power cycle the second network device 22.

In embodiments, the integrated router 10 may further include an external housing, formed by a top 28 and a bottom 30 cover, that houses a printed circuit board 32 having at least one processors 34 and a memory device 36. The integrated router 10 may further include a front 38 and a rear 40 overlay, one or more magnets 42 disposed in one or more rubber feet 44, one or more labels 46 and 48 disposed on the housing 28, 30, one or more fasteners 50, e.g., screws, and/or one or more indicator lights 52. As will be appreciated, in embodiments, the router 10 may further include a battery pack (not shown) operative to provide backup power to the router 10 in the event of a power loss such that the router 10 is able to send a message to an external user/machine, e.g., the first 20 and/or the second 22 network devices, notifying the user of the router's 10 power loss.

As shown in FIGS. 1 and 2, the power supply input 14 and the power supply output 16 penetrate the housing 28 and 30. The power supply input 14 may any type of power supply connector/adapter, to include a universal alternating current ("AC") snap-in inlet with a fuse holder. Similarly, the power supply output 16 may be any type of power supply connector/adapter, to include a NEMA 5-15 receptacle. As will be appreciated, the electrical power from the power supply 24 (FIG. 5) may be AC or direct current ("DC").

Figure 3:
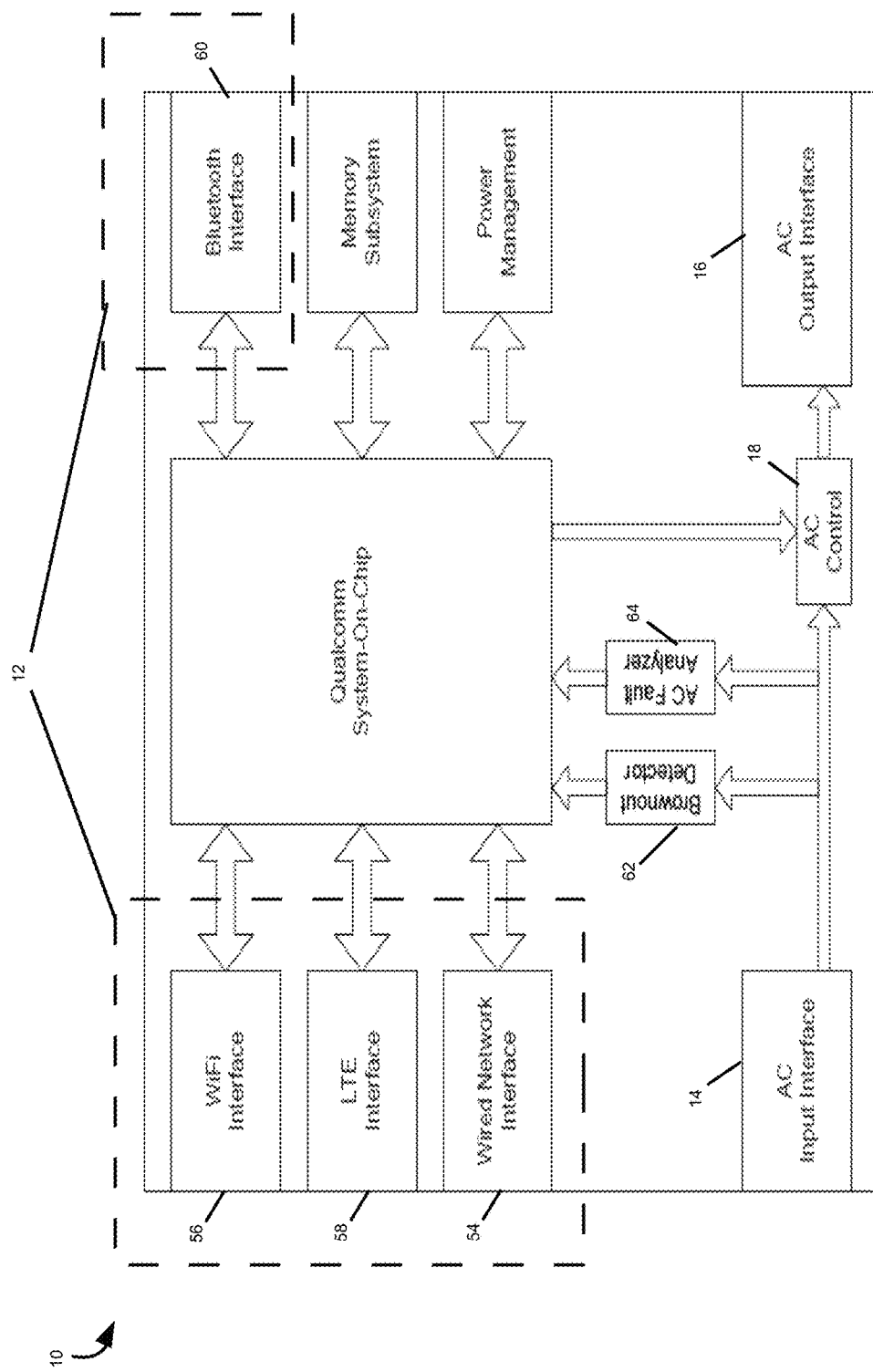
FIG. 3 is a high-level block diagram of the integrated router of FIG. 1, in accordance with an embodiment of the present invention.
Figure 4:
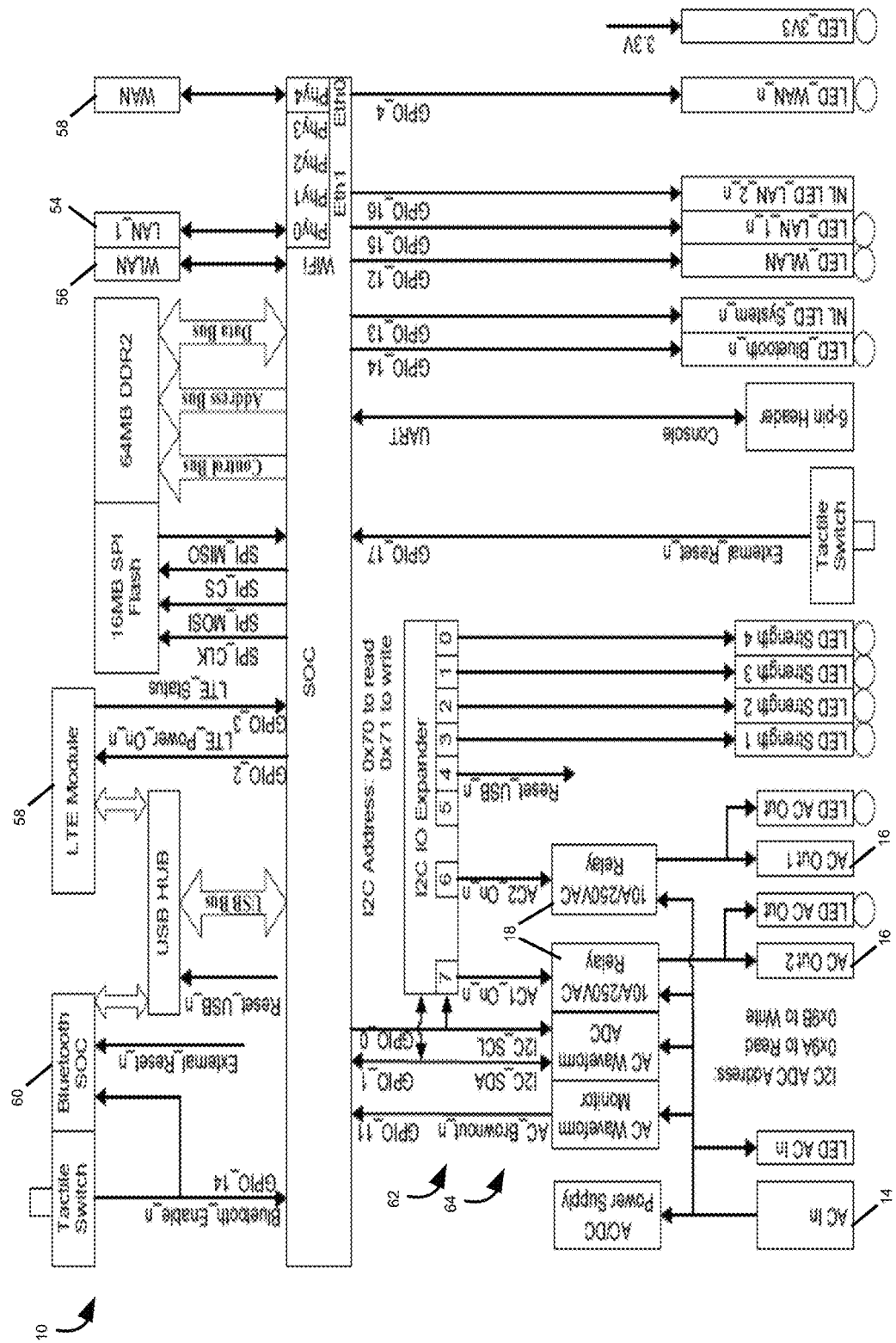
FIG. 4 is a detailed block diagram of the integrated router of FIG. 1, in accordance with an embodiment of the present invention.

Moving now to FIGS. 3 and 4, a high-level block diagram (FIG. 3) and a more detailed block diagram (FIG. 4) of the integrated router 10 are shown. As shown in FIG. 3, the at least one network interface 12 may include a wired network interface 54, e.g., TCP/IP via an RJ-45 or coaxial connector, and wireless network interfaces, e.g., 802.11 WiFi 56, Cellular 58, and Bluetooth 60. As will be appreciated, embodiments of the invention may implement other types of wired and wireless network interfaces that support other appropriate networking protocols.

As further shown in FIGS. 3 and 4, the integrated router 10 may also include a brownout detector 62 and/or a power waveform monitor 64. As will be understood, the brownout detector 62 is operative to detect power interruptions to the second network device 22 (FIG. 5) from the power supply 24 (FIG. 5), and to convey data concerning the detected power interruptions to the remote network device 26 (FIG. 5). In embodiments, the brownout detector 62 may detect power interruptions lasting less-than-or-equal to 35 ms. The power waveform monitor 64 is operative to analyze the electrical power from the power supply 24 and to convey data concerning the electrical power to the remote network device 26.

As illustrated in FIG. 5, the integrated router 10 may form part of a system 64 that includes the first 20, second 22, and remote 26 network devices. As will be appreciated, the double arrowed lines and the non-arrowed lines within FIG. 5 represent network connections and electrical power connections/circuits, respectively. In embodiments, the remote network device 26 may be separate and apart from the first network device 20. In other embodiments, however, the first network device 20 may be the remote network device 26.

In operation, in accordance with an embodiment of the invention, the system 64 may include a network 66 having an integrated router 10 connected to the Internet 68 via a cellular network 70 such that the integrated router 10 serves as the gateway for one or more network devices, e.g., an ATM 22, and a mobile device 72. As further illustrated in FIG. 5, a power supply 24 is connected to the integrated router 10 of network 66 via the power supply input 14 (FIGS. 2-4), and a power input, e.g., power plug, of the ATM 22 is connected/plugged into the power supply output 16 (FIGS. 2-4) of the same integrated router 10.

As will be appreciated, the system 64 may include another network 74 having an integrated router 10 connected to the Internet 68 via a wired WAN connection such that the integrated router 10 serves as the gateway for an ATM 22 within network 74. As will be appreciated, the ATM 22 in network 74 receives electrical power from a power supply 24 through the integrated router 10 of network 74 in the same manner described above with respect to the ATM 22 of network 66.

As will be further appreciated, the system 64 may include yet another network 76 having an integrated router 10 and an ATM 22 behind a gateway device 78, e.g., a firewall, with one or more additional network devices, e.g., a smart phone 80 and a laptop 82 connected to the gateway 78 via the integrated router 10. As will be appreciated, the ATM 22 in network 76 receives electrical power from a power supply 24 through the integrated router 10 of network 76 in the same manner described above with respect to the ATMs 22 of networks 66 and 74.

As will be appreciated, other network configurations utilizing different combinations of wired and/or wireless connections for the integrated routers 10, second network devices 22, e.g., ATMs, and/or additional network devices 72, 80, and 82 are possible. Additionally, while the integrated routers 10 are shown in FIG. 5 as routing traffic at the Open Systems Interconnection ("OSI") model layer 3, it will be understood that embodiments of the integrated router 10 may switch OSI layer 2 packets/datagrams.

Accordingly, as shown in FIG. 5, the second network devices 22, e.g., ATMs, within the system 64, are able to electronically communicate via the Internet 68 with the first network device 20, e.g., a data center/server, located in a network 84 separate from the networks 66, 74, and 76. Additionally, an operator/user/computer can power cycle the second network devices 22 in each of the networks 66, 74, and 76 via the remote network device 26, which may be in a different network 84 and/or 86. Moreover, the integrated routers 10 provide for additional network devices, 72, 80, and 82, which may be distributed across the various networks 66, 74, 76, to communicate with each other via the Internet 68.

Finally, it is also to be understood that the integrated router 10 and other components of the system 64 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein which may be in real-time. For example, as previously mentioned, the system may include at least one processor and system memory/data storage structures, which may include random access memory (RAM) and read-only memory (ROM). The at least one processor of the system may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium", as used herein, refers to any medium that provides or participates in providing instructions to the at least one processor of the system 64 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, an integrated router is provided. The integrated router includes at least one network interface, a power supply input, a power supply output, and a power cycling switch. The at least one network interface is operative to place a first network device in electronical communication with a second network device. The power supply input is operative to receive electrical power from a power supply. The power supply output is operative to provide the electrical power to the second network device. The power cycling switch electrically connects the power supply input to the power supply output and is operative to be toggled by a remote network device via the at least one network interface so as to power cycle the second network device. In certain embodiments, the first network device and the second network device are on separate OSI layer-three networks. In certain embodiments, the remote network device is the first network device. In certain embodiments, the at least one network interface is further operative to place a third network device in electronical communication with a fourth network device. In certain embodiments, the third network device and the fourth network device are on separate OSI layer-three networks. In certain embodiments, the integrated router further includes a brownout detector operative to detect power interruptions to the second network device from the power supply and to convey data concerning the detected power interruptions to the remote network device. In certain embodiments, the detected power interruptions are less-than-or-equal-to 35 ms. In certain embodiments, the integrated router further includes a power waveform monitor operative to analyze the electrical power from the power supply and to convey data concerning the electrical power to the remote network device. In certain embodiments, the at least one network interface includes a wired network interface. In certain embodiments, the at least one network interface includes a wireless network interface. In certain embodiments, the wireless network interface is at least one of a cellular connection, a WiFi connection, and a Bluetooth connection.

Other embodiments provide for a system. The system includes an integrated router, a first network device, a second network device, and a remote network device. The integrated router has at least one network interface, a power supply input operative to receive electrical power from a power supply, a power supply output, and a power cycling switch that electrically connects the power supply input to the power supply output. The first network device and the second network device are operative to electronically communicate with each other via the at least one network interface. The remote network device is operative to toggle the power cycling switch via the at least one network interface. The power supply output is operative to provide the electrical power to the second network device such that toggling the power cycling switch power cycles the second network device. In certain embodiments, the first network device and the second network device are operative to be on separate OSI layer-three networks. In certain embodiments, the remote network device is the first network device. In certain embodiments, the at least one network interface is operative to place a third network device in electronical communication with a fourth network device. In certain embodiments, the third network device and the fourth network device are on separate OSI layer-three networks. In certain embodiments, the integrated router further includes a brownout detector operative to detect power interruptions to the second network device from the power supply and to convey data concerning the detected power interruptions to the remote network device. In certain embodiments, the detected power interruptions are less-than-or-equal-to 35 ms. In certain embodiments, the integrated router further includes a power waveform monitor operative to analyze the electrical power from the power supply and to convey data concerning the electrical power to the remote network device. In certain embodiments, the at least one network interface includes a wired network interface. In certain embodiments, the at least one network interface includes a wireless network interface. In certain embodiments, the wireless network interface is at least one of a cellular connection, a WiFi connection, and a Bluetooth connection.

Yet still other embodiments provide for a method. The method includes: placing a first network device in electronical communication with a second network device by way of at least one network interface of an integrated router; receiving electrical power at a power supply input of the integrated router from a power supply; providing the electrical power to the second network device via a power supply output of the integrated router electrically connected to the power supply input via a power cycling switch of the integrated router; and power cycling the second network device by toggling the power cycling switch via a remote network device by way of the at least one network interface. In certain embodiments, the first network device and the second network device are on separate OSI layer-three networks. In certain embodiments, the remote network device is the first network device. In certain embodiments, the method further includes placing a third network device in electrical communication with a fourth network device via the at least one network interface. In certain embodiments, the third network device and the fourth network device are on separate OSI layer-three networks. In certain embodiments, the method further includes: detecting a power interruption to the second network device from the power supply via a brownout detector of the integrated router; and conveying data concerning the detected power interruption to the remote network device via the brownout detector. In certain embodiments, the detected power interruptions are less-than-or-equal-to 35 ms. In certain embodiments, the method further includes: analyzing the electrical power from the power supply via a power waveform monitor of the integrated router; and conveying data concerning the electrical power to the remote network device via the power waveform monitor. In certain embodiments, the at least one network interface includes a wired network interface. In certain embodiments, the at least one network interface includes a wireless network interface. In certain embodiments, the wireless network interface is at least one of a cellular connection, a WiFi connection, and a Bluetooth connection.

Accordingly, as will be appreciated, the present invention provides for increased ease of deploying and maintaining a single device that performs both routing and power cycling functions. For example, by providing for both network connectivity of one or more network devices, as well as the ability to remotely power cycle one or more of the connected network devices via the same, integrated device, the present invention provides for a smaller and more simplified form factor than traditional approaches which incorporate separate stand-alone routers and remote power switches. In other words, embodiments of the present invention minimize the number of supporting devices required to be disposed/installed at the location of remote network devices as compared to traditional designs, providing for a simpler and cleaner installation which requires less space.

Thus, in the event of a device failure and/or update, embodiments of the invention require only a single device be swapped out or upgraded. As such, embodiments of the present invention greatly reduce the amount of time that maintenance personnel must spend at the remote location for installation, troubleshooting and repair.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. An integrated router, comprising:
    at least one interface configured to place a first network device in electronic communication with a second network device;
    a power supply input configured to receive electrical power from a power supply;
    a power supply output configured to provide the electrical power to the second network device;
    a power cycling switch electrically connecting the power supply input to the power supply output and configured to be toggled by a remote network device via the at least one interface so as to power cycle the second network device; and
    a router housing integrating the at least one interface, the power supply input, the power supply output and the power cycling switch as a single device that performs routing and power cycling functions.

2. The integrated router of claim 1, wherein the first network device and the second network device are on separate OSI layer-three networks.

3. The integrated router of claim 1, wherein the remote network device is the first network device.

4. The integrated router of claim 1, wherein the at least one interface is further configured to place a third network device in electronic communication with a fourth network device.

5. The integrated router of claim 4, wherein the third network device and the fourth network device are on separate OSI layer-three networks.

6. The integrated router of claim 1, further comprising:
    a brownout detector configured to detect power interruptions to the second network device from the power supply and to convey data concerning the detected power interruptions to the remote network device.

7. The integrated router of claim 6, wherein the detected power interruptions are less than or equal to 35 ms.

8. The integrated router of claim 1, further comprising:
    a power waveform monitor configured to analyze the electrical power from the power supply and to convey data concerning the electrical power to the remote network device.

9. The integrated router of claim 1, wherein:
    the first network device and the second network device are external to the integrated router.

10. A system, comprising:
    an integrated router having at least one interface, a power supply input configured to receive electrical power from a power supply, a power supply output, a power cycling switch that electrically connects the power supply input to the power supply output, and a router housing incorporating the at least one interface, the power supply input, the power supply output and the power cycling switch as a single device that performs routing and power cycling functions;
    a first network device and a second network device configured to electronically communicate with each other via the at least one interface of the integrated router;
    a remote network device operatively coupled to the integrated router and configured to toggle the power cycling switch in the integrated router via the at least one interface; and
    wherein the power supply output in the integrated router is configured to provide the electrical power to the second network device such that toggling the power cycling switch power cycles the second network device.

11. The system of claim 10, wherein
    the first network device and the second network device are external to the integrated router.

12. The system of claim 10, wherein the remote network device is the first network device.

13. The system of claim 10, wherein the at least one interface is configured to place a third network device in electronical communication with a fourth network device.

14. The system of claim 13, wherein the third network device and the fourth network device are on separate OSI layer-three networks.

15. The system of claim 10, wherein the integrated router further includes a brownout detector configured to detect power interruptions to the second network device from the power supply and to convey data concerning the detected power interruptions to the remote network device.

16. The system of claim 14, wherein the detected power interruptions are less-than-or-equal-to 35 ms.

17. The system of claim 10, wherein the integrated router further includes a power waveform monitor configured to analyze the electrical power from the power supply and to convey data concerning the electrical power to the remote network device.

18. A method of remotely power cycling a network device, comprising:
    placing a first network device in electronic communication with a second network device by way of at least one interface of an integrated router;
    providing electrical power to the second network device via a power supply output of the integrated router; and
    power cycling the second network device by toggling a power cycling switch of the integrated router via a remote network device by way of the at least one interface;
    wherein the at least one interface, the power supply input, the power supply output and the power cycling switch are embodied in a router housing of the integrated router as a single device that performs routing and power cycling functions.

* * * * *